W. McCONNELL.
PIPE MACHINE.
APPLICATION FILED APR. 19, 1910.
1,019,505.
Patented Mar. 5, 1912.
3 SHEETS—SHEET 1.
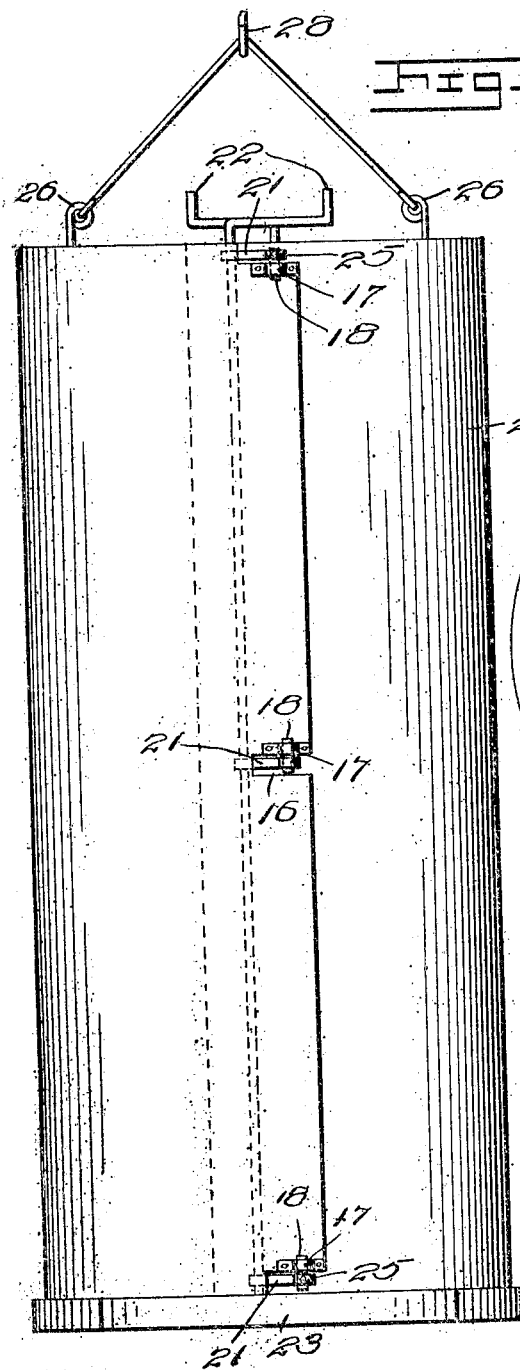
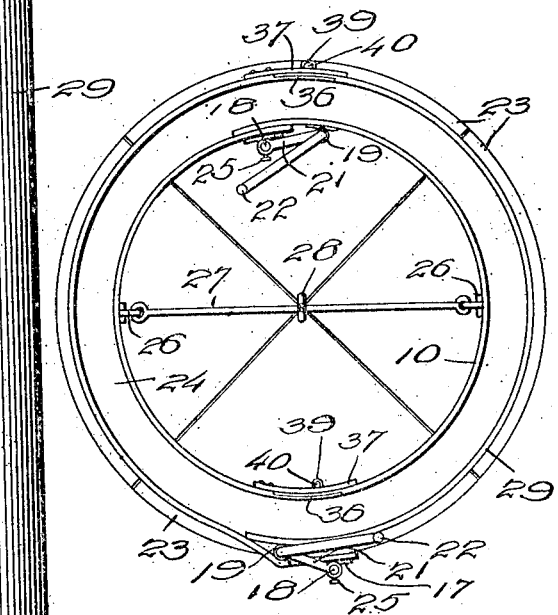
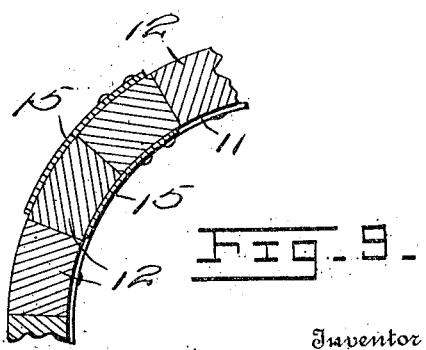
Inventor
Wm McConnell,
By Howard & Chandlee
Attorneys
Witnesses W. McCONNELL.
PIPE MACHINE.
APPLICATION FILED APR. 19, 1910.
1,019,505.
Patented Mar. 5, 1912.
3 SHEETS—SHEET 2.
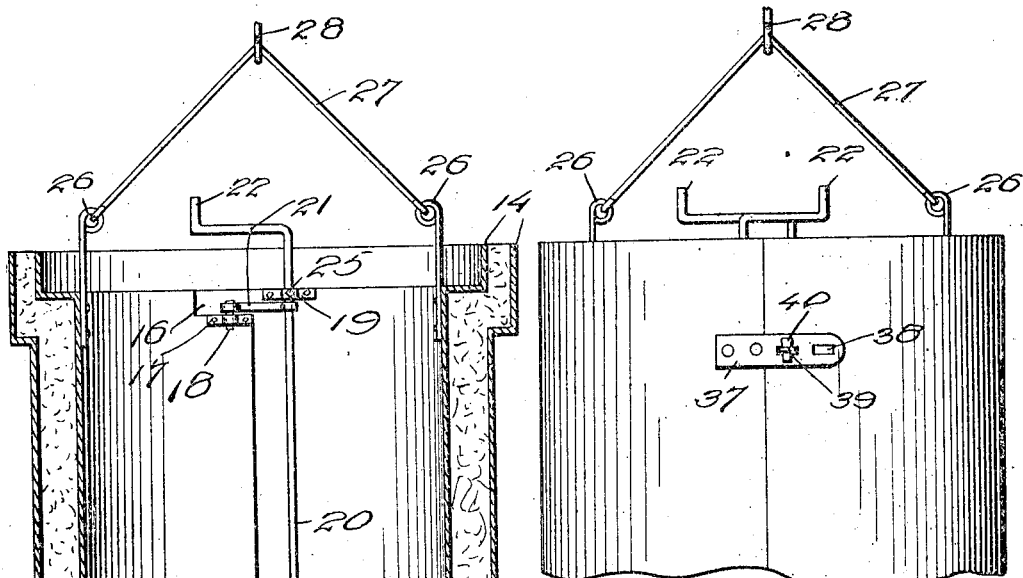
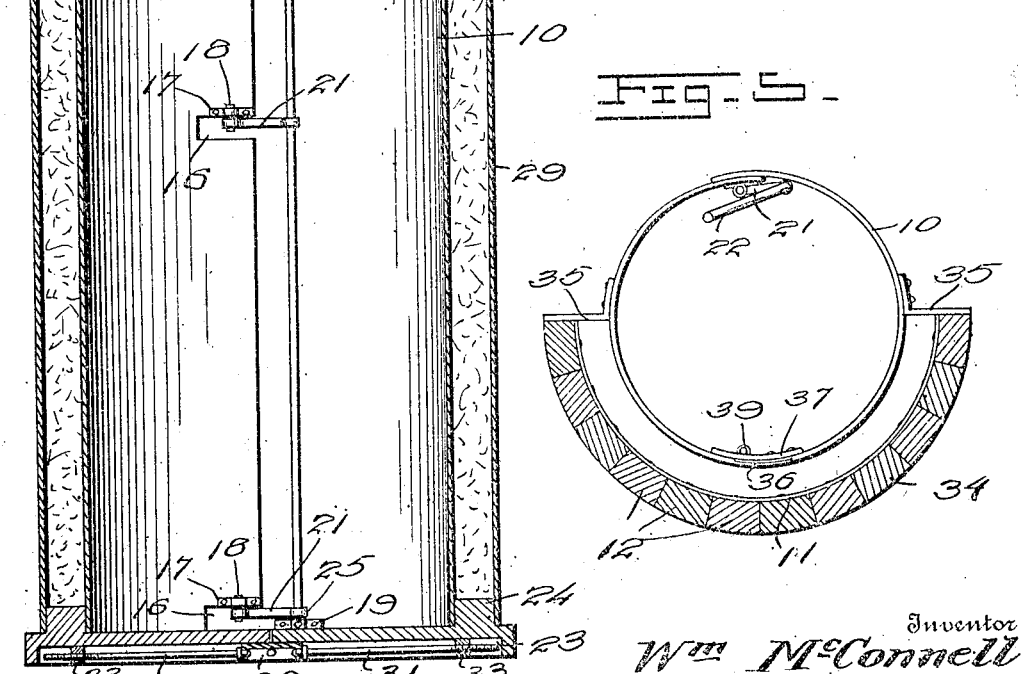
Witnesses
Inventor
Wm McConnell
By Woodward & Chandlee
Attorneys

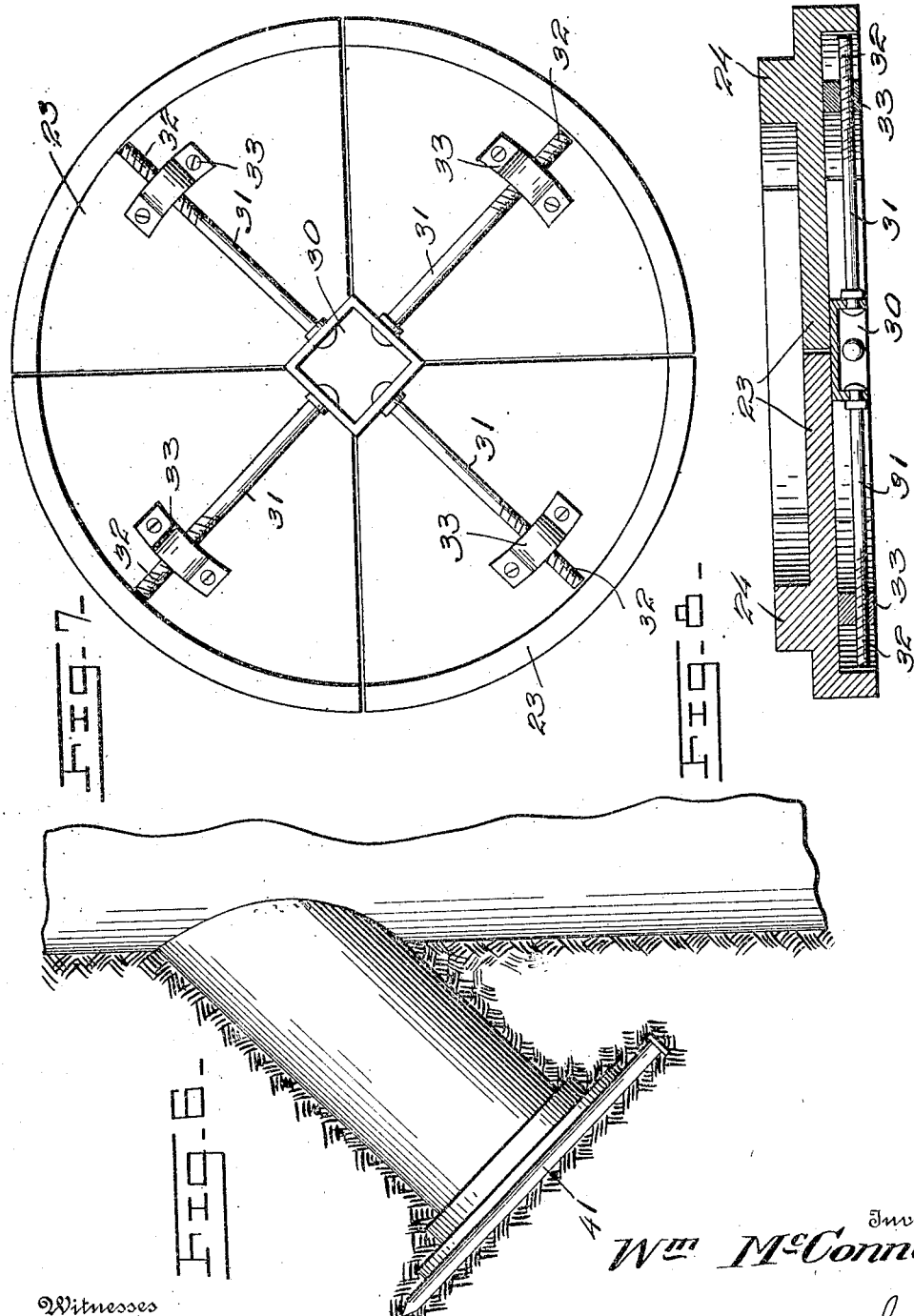

UNITED STATES PATENT OFFICE.

WILLIAM McCONNELL, OF SIOUX FALLS, SOUTH DAKOTA.

PIPE-MACHINE.

1,019,505.   Specification of Letters Patent.   Patented Mar. 5, 1912.

Application filed April 19, 1910. Serial No. 556,348.

*To all whom it may concern:*

Be it known that I, WILLIAM McCONNELL, a citizen of the United States, residing at Sioux Falls, in the county of Minnehaha and State of South Dakota, have invented certain new and useful Improvements in Pipe-Machines, of which the following is a specification.

This invention relates to pipe machines or molds for manufacturing pipe of cement or the like, of various sizes and forms, and in an expeditious manner.

An object of this invention is to provide such a construction, that pipes may be manufactured in any length desired and without being formed in a number of disconnected parts.

Another object is to provide a mold which will be readily adjustable to the desired size of which it is desired to mold a pipe and without the necessity of having to reach a distance within the mold, to release the mold upon the molded section, as has been a very serious objection to other devices heretofore patented.

Another object is to provide means for securing the meeting faces of the mold in their adjusted relative position in a novel manner, said means being composed of a small number of parts whereby the device is rendered simple and inexpensive.

A further object is to provide for the forming of a bell or flange upon the end of the pipe section, should it be desired to connect a larger pipe thereto, also to provide for the formation of joints at any position on the pipe section and at any angle therefrom, it being understood that a bell may be formed upon the jointed section, if desired.

A still further object is to provide novel means for releasing and moving the molded section, so that the section may be extended for a greater length, a very important feature of the operating mechanisms being the fact that the same are presented exteriorly of the mold so that the same can be easily manipulated.

Other objects and advantages will be apparent from the following description, and it will be understood that changes in the specific structure shown and described may be made within the scope of the claims without departing from the spirit of the invention.

In the drawings: Figure 1 is a side elevation of my improved mold. Fig. 2 is a plan view thereof. Fig. 3 is a vertical longitudinal central sectional view, on the line 3—3 of Fig. 2, Fig. 4 is a side elevation of a shell employed with my mold and in connection with which the pipe sections are formed. Fig. 5 is an end view of a mold section, of semi-circular form, more particularly adapted for laying pipe in ditches, Fig. 6 is a detail showing the manner of forming different shaped joints and a pin by which such sections are secured in position when molded, Fig. 7 is an underside view of the base, used in connection with my mold, Fig. 8 is a central sectional view of said base. Fig. 9 is a detail sectional view of a fragment of a mold casing formed of wood.

As shown in the drawings my improved device comprises a casing 10, which may be circular or of other shape which it is desired to mold the pipe sections, such casing being provided with circular reinforcing ribs 11, if desired, upon its interior face and at spaced distances from its top and bottom, said ribs being secured to the casing in any suitable manner, depending upon the material from which the casing is constructed. The casing 10 as shown, may comprise a single metallic plate, or the same may comprise a plurality of ribs of wood or the like 12, said ribs being secured together through the medium of the ribs or circular bands 11 aforesaid, securing means for the band being passed through the rib sections, whereby such sections are securely held in position, but still yield to allow separation of the parts of the mold, which are preferably secured in adjustable relation. The ends of the mold casing may have formed integral therewith, or secured thereto in any manner, a bell or flanged member 14, such bell being provided for the connection of other sections which may be of greater or less diameter, as is well known in the art.

I provide the meeting edges of the mold casing with suitable plates rigidly secured thereto upon the inner and outer faces of one edge adapted to overlap the coacting edges, such plates being numbered 15 in the drawings and being positioned over the inner and outer faces of the coacting sections, when in position for the forming of the pipe sections. The casing end is provided with a series of notched openings 16, disposed adjacent its upper and lower ends and at the center thereof, the uppermost and lowermost of said notches communicating with the ends of the casing, while the central notch has communication with the meeting edge thereof, these notched openings being provided on the edge of the casing which is disposed interiorly of the opposite edge; and secured to the inner wall of the casing disposed adjacent to one horizontal edge thereof are bearing brackets 17, said bearing brackets being secured a short distance from the edge of the plate and adjacent to the notched openings 16; said brackets having vertically disposed pivots 18 disposed therein. Secured adjacent the upper and lower ends of the casing and upon the opposite coacting edge are bearing brackets 19, in which is mounted a vertical shaft 20, having rigidly secured thereon, adjacent to the bearing brackets 17, crank arms 21, which are disposed over the pins 18, so that rotation of the shaft 20 through the medium of the operating handle 22, will rotate the arms 21 and draw the sections of the casing together, thereby tightly clamping it and its annular bell 14 disposed upon the upper face thereof, but I may omit this bell portion and simply rotate the shaft 20 to any desired position at which position it is held by the medium of set screws 25, which pass through the bearing brackets 19 from the inner sides transversely thereof and engage with the shaft 20, so as to frictionally hold it in any desired position of its rotation, thereby allowing the diameter of the casing to be regulated as desired and according to the size of the pipe to be molded.

The operating handle 22 and the set screw 25 may be disposed at either end of the section, so as to permit the reversal of the parts, and whereby a pipe section may be formed or molded at either end of the casing, thereby allowing the work to continue at both ends of the pipe section, which may be afterward joined to any other section of pipe, as desired. When it is desired to move the casing upon the molded section of the pipe after having been released therefrom, as described, I provide either end thereof with projecting arms 26; said arms 26 having their outer ends bent inwardly to form openings through which are received the draw band 27 having a suitable draw hold 28, by which said mold section may be grasped in order to move the same longitudinally of the molded section of the pipe, and as shown in the drawings, I have provided the arms 26, so that when the casing is formed with a bell or the like 14, and said arms are secured to the inner wall of the body of the casing from which the bells are extended, it of course being understood that I may omit the bells and secure the arms where the casing would be substituted therefor. Adapted to coact with this pipe molding casing I provide a shell 29, which has secured upon its outer surface, and adjacent its meeting edges, a similar arrangement of levers and the operating shaft as heretofore described, and by which the casing 10 is adjusted to different sizes, it of course being understood that the shell 29 may be positioned over the casing 10 and the thickness of the pipe regulated by the relative diameters of the casing and the shell.

In the molding of different sized pipe sections, at which time the relative diameters of the shell 29 and the casing 10 must be changed, it is necessary that the base portion 23 should be correspondingly changed so that the rib 24, will be received between the sections and in order to provide for such change, I provide the base portion with a central bracket 30, which is preferably constructed of angle iron and bent in rectangular shape, the sides of the bracket 30 having revolubly but longitudinally immovably received therein, the ends of suitable adjusting bolts 31, the opposite screw threaded ends 32 of which are received within the adjusting brackets 33, which are correspondingly screw threaded and are secured to the under face of the base portions, all of such parts being preferably formed of metal. It will thus be seen that by rotating the adjusting members 31 the four sections of the base will be moved outwardly or inwardly, as desired, so that the circumference of the rib 24 can be adjusted to suit the size of the pipe section which it is desired to mold between the casing and the shell.

When it is desired to form a pipe section within a ditch I provide a semicircular mold 34, which may be placed within the ditch with its open face upward, after which the casing is placed thereinto and the material of which the pipe is to be formed passed therebetween while in a green state. In order to support the casing upon this semicircular mold section, I provide the diametrically opposite sides thereof with supporting arms 35, which are secured at one end to the casing, the opposite ends of which extend outwardly therefrom at approximately right angles and are adapted to rest upon the upper edges of the mold 34. To regulate the diameters of the casing and shell so that different size pipes may be molded, I provide the meeting edges with recesses 36, disposed diametrically opposite to the adjusting means heretofore described, one of said meeting sections being provided with tongues 37 rigidly carried thereby, said tongues projecting beyond the edge of the coacting sections and being provided with a series of slotted openings 38, adapted to receive the staples 39 and when secured in this position they are held therein by means of pins 40 disposed transversely through the staples, such pins being preferably of wedg shape, so as to force the tongues in contact with the outer face of the overlapped sections. It will thus be seen that by providing these tongues and staples the tongues may be adjusted to different positions, thereby increasing or decreasing the circumference of the casing or shell, independent of the aforesaid mechanism. It is also apparent that in forming chimneys the outer shell may be done away with, the casing simply being placed within the brick portion of the chimney and the material molded therearound, the brick portion serving in lieu of the shell. Where it is desired to make connection with the main pipe section, in the form of T or Y joints, or to extend such connections at an angle therefrom, the said sections are placed in position and the material molded therearound. In order to hold these sections in place a pin 41 may be driven into the ground and in contact with the bell end of the joint, so as to rigidly hold the same in position until the molded material has fully set, at which time said pin may be removed and another section of pipe molded or joined to said branch pipe, as desired.

The material from which the pipes are molded may be any desired composition matter, in a green state, but from experience, I mix cement, sand and crushed rock or gravel, lime and sand or cement and sand and sufficient water to thoroughly wet the same, so that when compressed it will thoroughly coagulate to form a non-breakable material.

It will thus be seen that I have provided a mold for pipe sections or the like, which will permit pipe to be molded in any desired length and without joints, and which will further do away with the leakage at such joints, as is the usual objection to this manner of joining pipe sections.

It will also be seen that I have provided a very simple construction which will permit the pipe sections to be molded at a very rapid rate and wherein the mold forming sections may be easily regulated to different size pipes, and further my construction permits the movement of the mold free of the molded section, without the necessity of the inconvenient operation of reaching into the pipe as has been a further objection to other devices of this character.

Furthermore, the device may be applied for use in molding semicircular sections of pipe or culverts, chimney pipe or other vertically extended pipe which require a base for supporting the same and it will also be seen that connections may be made with a molded section of pipe at any desired angle and in any position along its length.

What is claimed is:

1. An adjustable base for pipe molds, comprising a disk divided into a plurality of sector shaped members, said disk having a depending peripheral flange and a smaller upstanding annular flange projecting in the opposite direction from the peripheral flange, a plate disposed centrally of the disk on the side having the depending flange, said plate having depending sides, bolts rotatably secured to the depending sides, and threaded bearing blocks secured to the sectors and engaging the ends of the bolts, whereby rotation of the bolts serves to radially shift the sectors to vary the perimeter of the annular flange.

2. A mold comprising a circular shell, a casing disposed within said shell and spaced therefrom, said shell and casing comprising sections having overlapped edges, means disposed at said overlapped edges whereby the diameters of the shell and casing may be varied, additional means disposed on the opposite sides of the casing and shell for varying the diameters thereof, and an adjustable base provided with a rib adapted to fit between the shell and casing, said base comprising a circular plate divided segmentally, adjusting screws journaled in but longitudinally immovable from the central point of said base and bearing brackets secured to the under side of the sections adapted to receive said adjusting screws, whereby rotation of the screws in either direction will transmit longitudinal movement to the sections.

In testimony whereof I affix my signature, in presence of two witnesses.

WILLIAM McCONNELL.

Witnesses:
Chas. A. O'Connor,
T. M. O'Connor.